3,026,667
RAKE TOOTH ASSEMBLY
James L. Morrison and Philip D. Wenzel, Stockton, Calif., assignors to J. I. Case Company, Racine, Wis., a corporation of Wisconsin
Filed Sept. 22, 1959, Ser. No. 841,475
1 Claim. (Cl. 56—400)

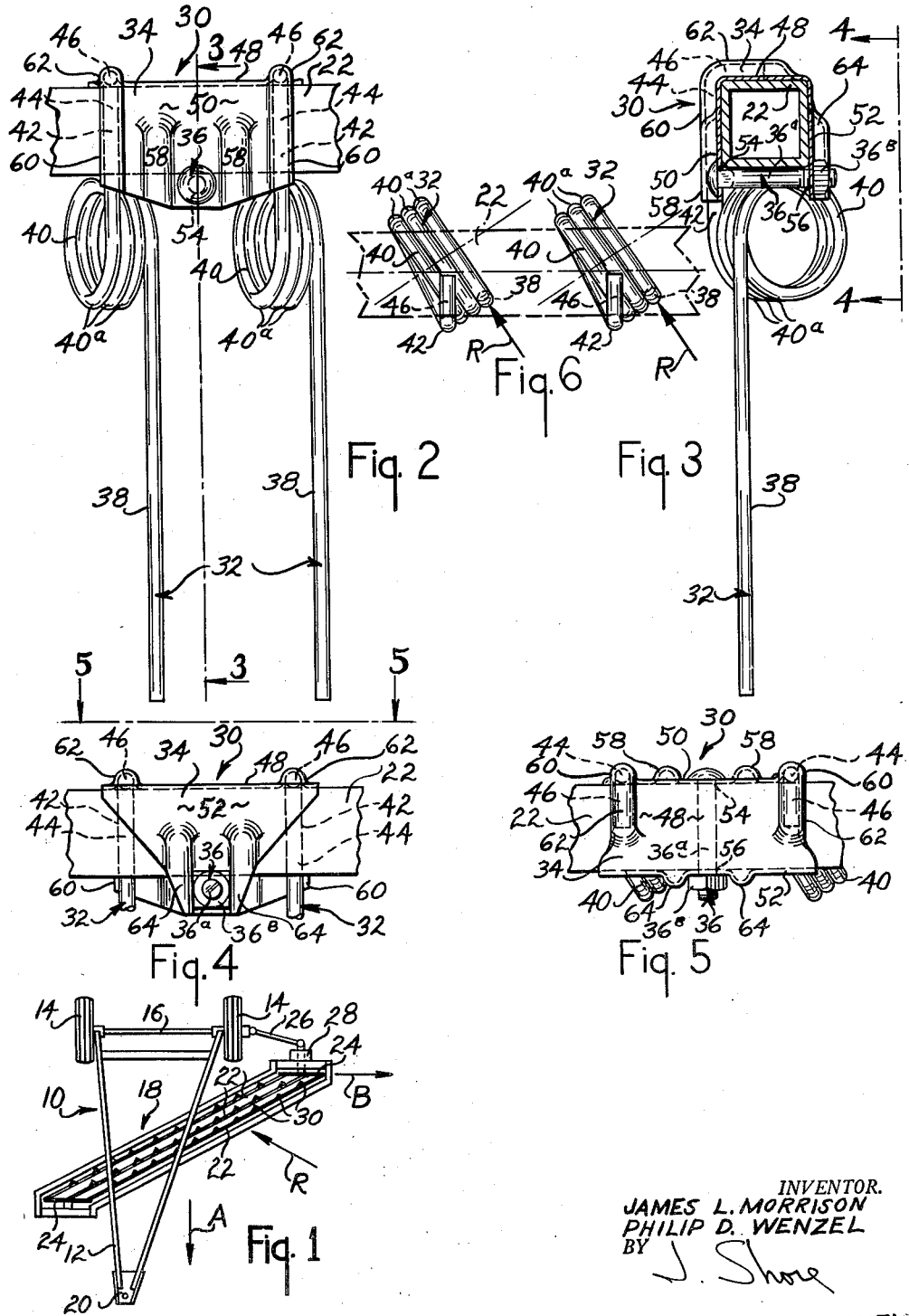

The present invention relates to hay rakes and more particularly, to a rake tooth assembly for a side delivery rake.

In a conventional side delivery rake, the rake teeth are mounted on rake tooth bars which extend between rotatably mounted spiders that form the end portions of the raking reel. The rake teeth are generally secured to the rake tooth bars by bolt and nut fastening means extending through registering apertures in the tooth bars and the tooth assemblies. The apertures in the tooth bars are spaced at given intervals along the length thereof to give the rake teeth a permanent predetermined spacing. Although this type of construction has been satisfactory, there are certain disadvantages attendant with such an arrangement. Providing apertures in the tooth bars tends to weaken the bars and cause bar failure, especially at high raking speeds. The provision of apertures in the tooth bars for securing the rake teeth allows for only one spacing of the rake tooth assemblies and does not permit selective adjustment of the tooth assemblies or the addition of more tooth assemblies, if deemed necessary.

Another problem with side delivery rakes is that the wear life of a rake tooth is relatively short due to the fact that the rake teeth frequently strike obstructions in the field and break. Heretofore, it has been a common practice to make rake teeth in pairs from single lengths of wire, each having a coil portion formed for each tine and an intermediate shank portion that is secured to the rake tooth bar. The disadvantage of this type of double rake tooth is that when one tooth breaks, it is necessary to replace the pair in which only one tooth is broken or damaged, with a new pair of rake teeth.

Accordingly, it is an object of the present invention to provide a rake tooth assembly which is mounted externally of the rake tooth bar, thereby permitting the use of a non-apertured rake tooth bar.

Another object is to provide a rake tooth assembly that is laterally adjustable along the length of the rake tooth bar.

A still further object is to provide a rake tooth assembly which uses individual rake teeth, thereby permitting the use of identical, interchangeable, single tine rake teeth.

Other objects and advantages will become apparent from the following detailed description taken in conjunction with the accompanying drawings in which:

FIG 1 is a plan view of a side delivery rake embodying the present invention;

FIG. 2 is an enlarged elevational view of the rake tooth assembly and rake tooth bar with parts broken away;

FIG. 3 is a sectional view taken on line 3—3 of FIG. 2;

FIG. 4 is an elevational view of the rake tooth assembly taken on line 4—4 of FIG. 3;

FIG. 5 is a plan view of the rake tooth assembly taken on line 5—5 of FIG. 4;

FIG. 6 is a plan view of the rake teeth with the rake tooth clamp removed, showing their respective locations on the rake tooth bar, which is shown in dot dash lines.

Generally stated, the invention is practiced by providing a rake tooth assembly which utilizes two individual identical rake teeth that are secured to a non-apertured rectangular cross-section rake tooth bar by a single clamping means, thereby permitting replacement of individual rake teeth and selective adjustment of the rake tooth assembly.

Referring now to the drawings, particularly FIG. 1, the reference character 10 generally refers to a side delivery rake having a V-shaped frame 12 supported at its rear end by wheels 14 which are mounted on axle 16. A raking reel 18 is suspended from the frame 12 in a conventional manner which is not important to an understanding of the present invention. The frame 12 is connected to a tractor (not shown) by the hitch 20 for pulling the rake across the field. The direction of travel and velocity of the implement is denoted by arrow A.

The raking reel 18 includes four or more equally circumferentially spaced parallel rake tooth bars 22 which are rotatably supported between parallel end plates or spiders 24. The reel 18 is suitably driven by ground engaging wheels 14 through an universal shaft 26 and a gear mechanism (not shown) in gear box 28. The direction of rotation and velocity of the raking reel is denoted by arrow B.

Since the details of the drive mechanism constitute no part of the present invention, it is not thought necessary to further illustrate or describe them.

Referring now to FIGS. 2 through 6, it will be seen that the rake tooth bars 22 are rectangular in cross section. Each tooth bar carries along the length thereof, a plurality of spaced rake tooth assemblies, indicated generally at 30. The rake tooth assemblies 30, each include a pair of identical, interchangeable, individual rake teeth 32; a rake tooth clamping element 34; and a fastening means 36.

Each rake tooth 32 is made from a single length of wire which is formed into a depending tine portion 38, a coil portion 40, and an upstanding attaching portion 42. The upstanding attaching portion 42 is formed at a right angle so as to embrace adjacent sides of the rake tooth bar 22, and includes a first part 44 which is generally coplanar with the depending tine 38 and a second part 46 which is normal to the first part 44.

The clamping element 34, which secures the teeth 32 to the rake tooth bar 22, is formed from sheet metal and comprises a middle portion 48 abutting the upper surface of the tooth bar 22, and two depending parallel side portions 50 and 52 disposed adjacent opposite sides of the tooth bar 22. The parallel side portions 50 and 52 are provided with a pair of registering apertures 54 and 56 to accommodate the fastening means 36 for locking the rake tooth assembly 30 to the tooth bar 22, which in this case is a conventional bolt 36a and a nut 36b. Provided in side portion 50 of the clamping element 34 is a pair of channel-like reinforcing ribs 58 which strengthen the clamp to prevent any substantial bending when force is applied to the fastening means 36. Also provided in the side portion 50 is a pair of channels 60 which are adapted to snugly embrace the portion 44 of the upstanding attaching portion 42 of the rake tooth 32 to position the rake tooth 32 on the tooth bar 22. The middle portion 48 of the clamping element 34 is normal to the parallel side portions 50 and 52 and defines a pair of channels 62 which are extensions of the channels 60 in the side portion 50, and which extend over half of the distance across the middle section 48. The other side portion 52 is also provided with a pair of channel-like reinforcing ribs 64 to further strengthen the clamping element 34.

Looking now to FIG. 6, it will be noted that the axis of the coil 40 of rake tooth 32 is at an acute angle to the axis of the tooth bar 22 and is normal to the resultant of the reaction forces (denoted by the arrow R) applied to the rake tooth 32 as it traverses its path over the ground during operation. The coil 40 is positioned in this manner so that as tine 38 strikes any obstruction on the ground, the turns 40a of the coil 40 will be free to wind up and absorb the shock and allow the tine 38 to pass over the obstruction. If the coil 40 was arranged at any other substantial angle than normal to resultant R, whenever an obstruction was encountered, the turns 40a of the coil 40 would either bind one another or spread apart, thereby limiting their flexibility. This type of action would reduce the efficiency of the coil 40 and eventually could cause breakage of the rake teeth 32.

The rake tooth assembly 30 is assembled on the rake tooth bar in the following manner. The rake teeth 32 are arranged in pairs, with their upstanding attaching portions 42 brought into contact with adjacent surfaces of the tooth bar 22. The clamping element 34 is then mounted on the rake tooth bar 22 so that it abuts the tooth bar 22 on three sides, and side portion 50 positions the rake teeth 32 relative to the axis of the tooth bar 22. The clamping element 34 is then secured to the tooth bar 22 by fastening means 36 which extends through the apertures 54 and 56 of the clamp side portions 50 and 52 respectively. It will be seen that when the rake tooth assembly is mounted on the bar 22, the apertures 54 and 56 of the clamp side portions 50 and 52 are positioned below the lower surface of the tooth bar 22 to accommodate the fastening means 36.

The rake tooth assembly 30 has been positively locked to the rake tooth bar 22 without the necessity of holes in the tooth bar 22, and should the operator require any adjustment of the rake tooth assembly 30, it merely requires the loosening of fastening means 36 and moving the rake tooth assembly 30 to the desired position.

Thus it can be appreciated that the present invention provides a simple, economical, and stronger rake tooth assembly which enables selective adjustment, quick and effective repair, and extended wear life.

While we have illustrated and described a particular embodiment of our invention, modifications thereof will occur to those skilled in the art, and it is desired to cover by the appended claim all such modifications as fall within the true spirit and scope of this invention.

What we claim as new and desire to secure by Letters Patent of the United States is:

In a side delivery rake, a rake tooth bar having a rectangular cross section, a rake tooth element depending from the rake tooth bar and having an upper attaching portion snugly abutting adjacent sides of said rake tooth bar; the upper attaching portion of the rake tooth having a first portion and a second portion disposed normal to the first portion, a clamping element having a central portion and two depending side portions constructed and arranged to extend around three sides of the rake tooth bar, one of the side portions of the clamp element embracing the first portion of the rake tooth and the central portion of the clamp element embracing the second portion of the rake tooth when the rake tooth and the clamp are positioned on the rake tooth bar, a bolt means for securing the clamp element to the rake tooth bar and positioned outside the confines of the rake tooth bar and in engagement with the side portions of the clamp element.

References Cited in the file of this patent

UNITED STATES PATENTS

| | | |
|---|---|---|
| 651,087 | Ream | June 5, 1900 |
| 1,126,813 | Macphail | Feb. 2, 1915 |
| 2,490,237 | Silver | Dec. 6, 1949 |
| 2,608,046 | Best | Aug. 26, 1952 |
| 2,719,401 | Erickson et al. | Oct. 4, 1955 |